US011693620B2

(12) United States Patent
Oe et al.

(10) Patent No.: US 11,693,620 B2
(45) Date of Patent: Jul. 4, 2023

(54) INFORMATION PROCESSING APPARATUS, INFORMATION PROCESSING METHOD, AND NON-TRANSITORY COMPUTER-READABLE STORAGE MEDIUM

(71) Applicant: Humming Heads, Inc., Tokyo (JP)

(72) Inventors: Naoyuki Oe, Tokyo (JP); Takuma Sugita, Tokyo (JP); Makoto Kurita, Tokyo (JP); Yuichi Yasuda, Tokyo (JP); Shogo Otsuka, Tokyo (JP); Kenichi Yasuda, Tokyo (JP)

(73) Assignee: Humming Heads, Inc., Tokyo (JP)

( * ) Notice: Subject to any disclaimer, the term of this patent is extended or adjusted under 35 U.S.C. 154(b) by 634 days.

(21) Appl. No.: 16/814,170

(22) Filed: Mar. 10, 2020

(65) Prior Publication Data

US 2020/0293275 A1 Sep. 17, 2020

(30) Foreign Application Priority Data

Mar. 15, 2019 (JP) .................................. 2019-048717

(51) Int. Cl.
*G06F 3/16* (2006.01)
*G10L 15/22* (2006.01)
(Continued)

(52) U.S. Cl.
CPC .............. *G06F 3/167* (2013.01); *G06F 9/451* (2018.02); *G10L 15/22* (2013.01); *G06F 9/445* (2013.01);
(Continued)

(58) Field of Classification Search
CPC .. G06F 3/167; G06F 2203/0381; G06F 9/445; G06F 9/451; G10L 15/22; G10L 2015/223
See application file for complete search history.

(56) References Cited

U.S. PATENT DOCUMENTS

| 8,498,670 B2* | 7/2013 | Cha ......................... G10L 15/22 |
| | | 455/418 |
| 8,983,938 B1* | 3/2015 | Clark ...................... H04L 67/34 |
| | | 717/124 |

(Continued)

FOREIGN PATENT DOCUMENTS

| JP | 2013-137584 A | 7/2013 |
| JP | 2017-146729 A | 8/2017 |
| JP | 2017-195633 A | 10/2017 |

OTHER PUBLICATIONS

Extended European Search Report dated Sep. 4, 2020, issued in corresponding European Patent Application No. 20161790.9.
(Continued)

*Primary Examiner* — Tuyetlien T Tran
(74) *Attorney, Agent, or Firm* — Venable LLP (57) ABSTRACT

An information processing apparatus comprises a first acquiring unit configured to acquire a command input to application software, a second acquiring unit configured to acquire scene information representing a scene represented by a screen displayed when executing the application software, a third acquiring unit configured to acquire a command file based on the command and the scene information, and an execution unit configured to execute processing in accordance with the command file.

12 Claims, 4 Drawing Sheets

(51) Int. Cl.
  *G06F 9/451* (2018.01)
  *G06F 9/445* (2018.01)
(52) U.S. Cl.
  CPC ............... *G06F 2203/0381* (2013.01); *G10L 2015/223* (2013.01)

(56) References Cited

U.S. PATENT DOCUMENTS

| | | | |
|---|---|---|---|
| 10,515,625 B1* | 12/2019 | Metallinou | G10L 15/197 |
| 10,521,189 B1* | 12/2019 | Ryabov | G06F 40/117 |
| 2012/0215543 A1* | 8/2012 | Oz | G06F 8/38 |
| | | | 704/E15.001 |
| 2013/0166300 A1 | 6/2013 | Yokoyama et al. | |
| 2014/0006028 A1* | 1/2014 | Hu | G10L 17/04 |
| | | | 704/251 |
| 2017/0031652 A1* | 2/2017 | Kam | G06F 3/167 |
| 2017/0236513 A1* | 8/2017 | Choudhury | G10L 15/063 |
| | | | 704/244 |
| 2019/0179606 A1* | 6/2019 | Thangarathnam | G10L 15/22 |
| 2019/0311717 A1* | 10/2019 | Kim | G06F 3/167 |
| 2020/0168215 A1* | 5/2020 | Heo | G10L 15/1815 |

OTHER PUBLICATIONS

Japanese Office Action dated Apr. 22, 2022, issued in corresponding Japanese Patent Application No. 2019-048717.

* cited by examiner

INFORMATION PROCESSING APPARATUS, INFORMATION PROCESSING METHOD, AND NON-TRANSITORY COMPUTER-READABLE STORAGE MEDIUM

CROSS-REFERENCE TO RELATED APPLICATION(S)

This application claims priority to and the benefit of Japanese Patent Application No. 2019-048717 filed on Mar. 15, 2019, the entire disclosure of which is incorporated herein by reference.

BACKGROUND OF THE INVENTION

Field of the Invention

The present invention relates to an application program execution control technique.

Description of the Related Art

Knowledge about an operation method is required to operate application software installed in a computer apparatus such as a smartphone. Japanese Patent Laid-Open No. 2017-195633 discloses a technique for executing a desired function with a small number of operations in an application operation in an apparatus such as a smartphone.

As described above, the knowledge about the operation method of the application software is required to operate the application software. In addition, different operation methods are required for the respective application software programs although equivalent operations are performed. As described above, in order to achieve a desired purpose using application software, knowledge about a variety of application software programs is required.

SUMMARY OF THE INVENTION

The present invention provides a technique for reducing a load on a user to achieve a desired purpose using application software in consideration of the above problem.

According to the first aspect of the present invention, there is provided an information processing apparatus comprising: a first acquiring unit configured to acquire a command input to application software; a second acquiring unit configured to acquire scene information representing a scene represented by a screen displayed when executing the application software; a third acquiring unit configured to acquire a command file based on the command and the scene information; and an execution unit configured to execute processing in accordance with the command file.

According to the second aspect of the present invention, there is provided an information processing apparatus comprising: a first acquiring unit configured to acquire scene information representing a scene represented by a screen displayed when a condition is satisfied; a second acquiring unit configured to acquire a command file based on the scene information; and an execution unit configured to execute processing in accordance with the command file.

According to the third aspect of the present invention, there is provided an information processing method comprising: acquiring a command input to application software; acquiring scene information representing a scene represented by a screen displayed when executing the application software; acquiring a command file based on the command and the scene information; and executing processing in accordance with the command file.

According to the fourth aspect of the present invention, there is provided an information processing method comprising: acquiring scene information representing a scene represented by a screen displayed when a condition is satisfied; acquiring a command file based on the scene information; and executing processing in accordance with the command file.

According to the fifth aspect of the present invention, there is provided a non-transitory computer-readable storage medium storing a computer program for causing a computer to function as: a first acquiring unit configured to acquire a command input to application software; a second acquiring unit configured to acquire scene information representing a scene represented by a screen displayed when executing the application software; a third acquiring unit configured to acquire a command file based on the command and the scene information; and an execution unit configured to execute processing in accordance with the command file.

According to the sixth aspect of the present invention, there is provided a non-transitory computer-readable storage medium storing a computer program for causing a computer to function as: a first acquiring unit configured to acquire scene information representing a scene represented by a screen displayed when a condition is satisfied; a second acquiring unit configured to acquire a command file based on the scene information; and an execution unit configured to execute processing in accordance with the command file.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Figure 1:
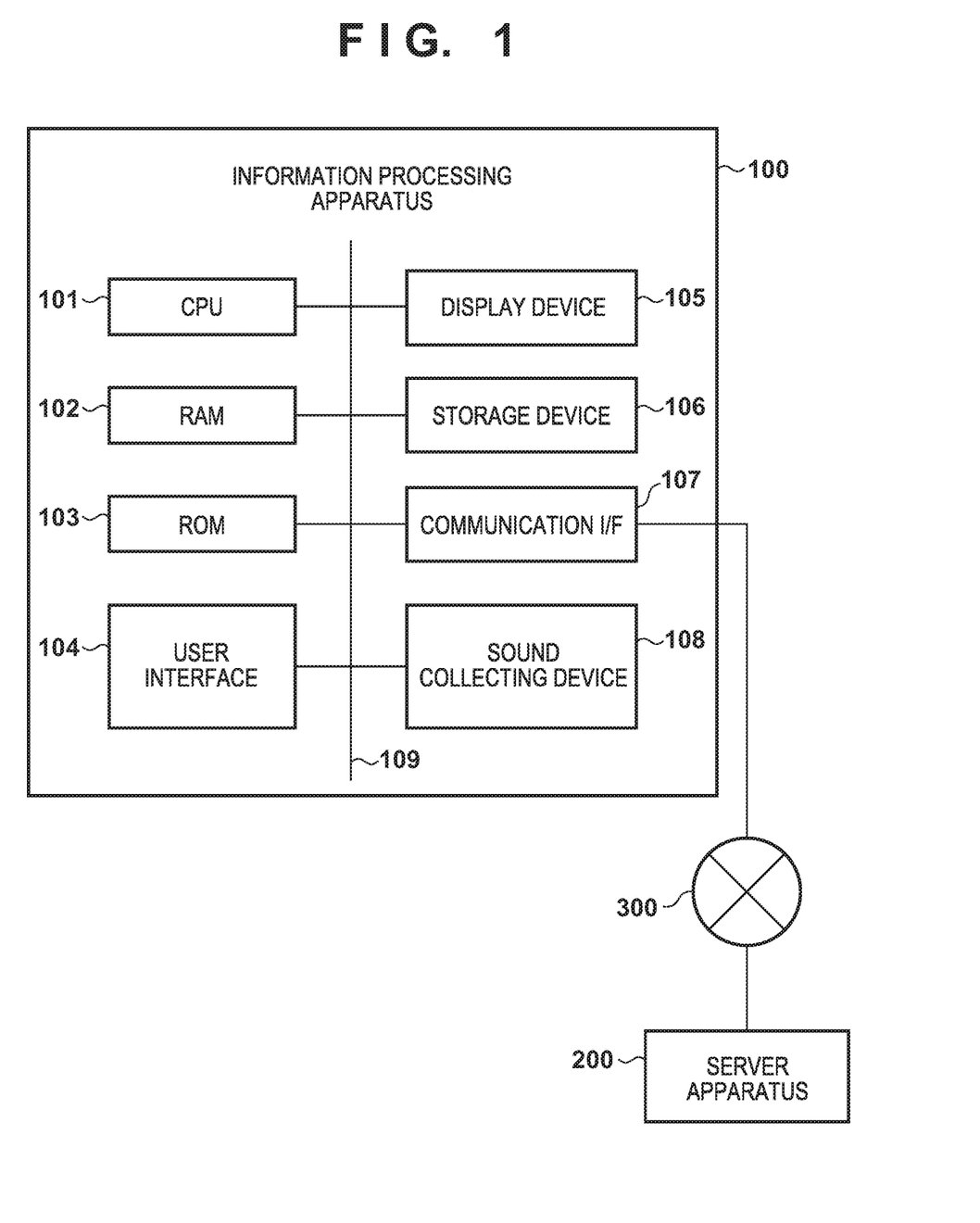
FIG. 1 is a block diagram showing an example of the arrangement of a system.

First, an example of the arrangement of a system according to this embodiment will be described with reference to the block diagram in FIG. 1. As shown in FIG. 1, the system according to this embodiment includes an information processing apparatus 100, and a server apparatus 200 capable of communicating with the information processing apparatus 100 via a network 300.

The information processing apparatus 100 will be described first. The information processing apparatus 100 comprises a computer apparatus such as a smartphone, a tablet type terminal apparatus, a PC (Personal Computer), and an IoT (Internet of Things) device having a display screen.

A CPU 101 executes various kinds of processes using computer programs and data stored in a RAM 102 and a ROM 103. Accordingly, the CPU 101 performs overall operation control of the information processing apparatus 100 and executes or controls respective processes (to be described later) to be executed by the information processing apparatus 100. Note that a GPU may be arranged in place of or in addition to the CPU 101. In this case, the GPU executes some or all the processes (to be described later) to be executed by the CPU 101.

The RAM 102 has an area for storing the computer programs and data loaded from the ROM 103 and a storage device 106 and data downloaded from the server apparatus 200 via a communication I/F 107. In addition, the RAM 102 has a work area used to cause the CPU 101 to execute various kinds of processes. In this manner, the RAM 102 can provide various kinds of areas as needed.

The ROM 103 stores the setting data and the start programs of the information processing apparatus 100.

A user interface 104 includes a keyboard, a mouse, and a touch panel screen and is used to make the user perform various kinds of operation inputs. Various kinds of commands input by making the user operate the user interface 104 are notified to the CPU 101.

A display device 105 includes a liquid crystal screen and a touch panel screen. The display device 105 can display the processing result of the CPU 101 using images, characters, and the like. Note that the display device 105 may be a projection device such as a projector for projecting images and characters.

The storage device 106 comprises a storage device such as a hard disk drive and an EEPROM which can store a large volume of information as compared with the RAM 102 and the ROM 103. The storage device 106 stores an OS (Operating System), various kinds of application software programs, various kinds of data required to execute the application software, and the like. The computer programs and data stored in the storage device 106 are loaded to the RAM 102, as needed, under the control of the CPU 101 and serve as the processing targets for the CPU 101.

The communication I/F 107 is used to allow data communication between the information processing apparatus 100 and the server apparatus 200 via the network 300. The data communication between the information processing apparatus 100 and the server apparatus 200 via the network 300 is performed via this communication I/F 107.

A sound collecting device 108 is a device for collecting sounds such as a user's voice and outputs the voice data corresponding to the collected voice. The voice data output from the sound collecting device 108 is stored in the RAM 102 or the storage device 106.

The CPU 101, the RAM 102, the ROM 103, the user interface 104, the display device 105, the storage device 106, the communication I/F 107, and the sound collecting device 108 are connected via a bus 109. Note that the arrangement of the information processing apparatus 100 shown in FIG. 1 can be appropriately modified or changed (including an omission) in accordance with an apparatus (a smartphone, a tablet type terminal device, a PC, or the like) to which the information processing apparatus 100 is applied. For example, the arrangement of the information processing apparatus 100 may include, for example, a loudspeaker, a vibrator, a state indicator lamp, various kinds of sensors, an image capturing device, and a GPS receiver for measuring the position and posture of the apparatus itself.

Next, the server apparatus 200 will be described below. The server apparatus 200 comprises a computer apparatus having the same hardware arrangement as that of, for example, the information processing apparatus 100. The server apparatus 200 holds some or all the pieces of information necessary for allowing the information processing apparatus 100 to execute processes (to be described later).

Next, the network 300 will be described below. The network 300 is made of a wired and/or wireless network such as a LAN or the Internet. As described above, the information processing apparatus 100 and the server apparatus 200 can perform data communication via the network 300.

Figure 2:
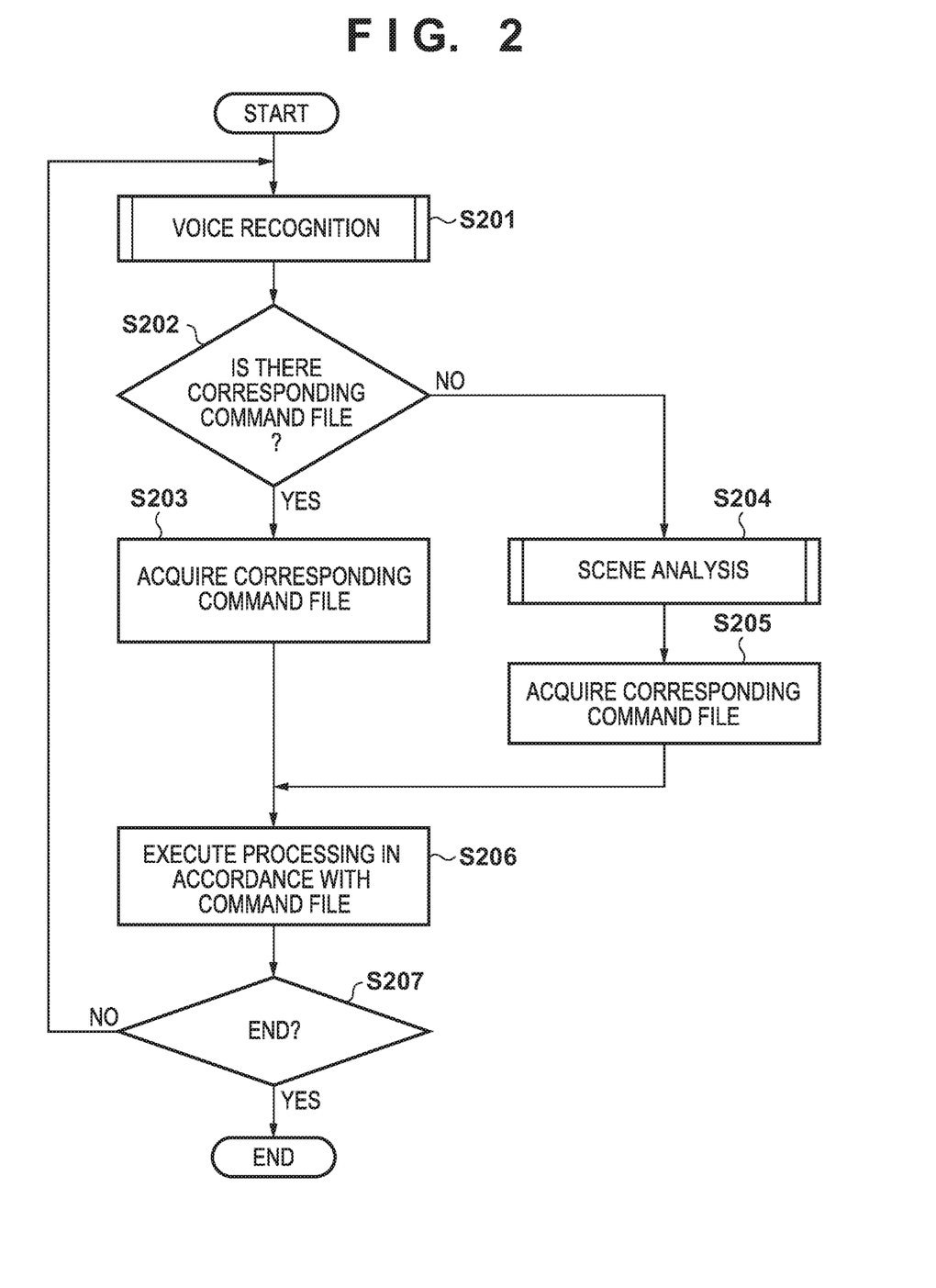
FIG. 2 is a flowchart showing the operation of an information processing apparatus 100 which is executing application software.

Next, the operation of the information processing apparatus 100 which is executing application software will be described with reference to the flowchart in FIG. 2. This application software can be calendar application software which accepts date and a schedule input at this date and registers the input schedule and the input date in association with each other. As another example, the application software may be application software which accepts search information (for example, a departure place, a destination, and a date) necessary for a route search and outputs information matching the input search condition. In this manner, the processing according to the flowchart in FIG. 2 is processing executed by the information processing apparatus 100 which is executing the application software capable of inputting a command and an input item.

<Step S201>

If the user utters a voice to the sound collecting device 108 which is activated to accept a voice input, the sound collecting device 108 generates a voice signal corresponding to the input voice and generates and outputs voice data corresponding to the voice signal by performing conversion such as A/D conversion for the generated voice signal. If the CPU 101 acquires the voice data output from the sound collecting device 108, the CPU 101 performs voice recognition for the voice data. This voice recognition can be performed such that the CPU 101 executes voice recognition software included in the application software. Alternatively, the voice recognition may be performed by starting and executing another voice recognition application software (stored in the storage device 106) different from the application software.

Figure 3:
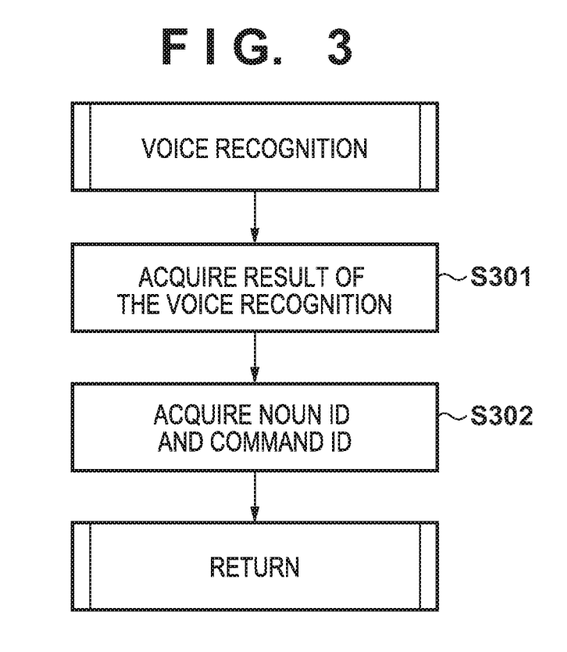
FIG. 3 is a flowchart showing the details of processing in step S201.

The details of the processing in step S201 will be described with reference to the flowchart in FIG. 3.

<Step S301>

The CPU 101 performs the voice recognition for the voice data output from the sound collecting device 108 and acquires, as a result of the voice recognition, text data (the text data representing the contents uttered by the user) corresponding to the voice data. The CPU 101 may display the acquired text data on the display screen of the display device 105.

<Step S302>

The CPU 101 performs analysis processing such as parsing for the text data obtained in step S301, thereby specifying a noun, a verb, and the like included in the text data.

If the CPU 101 obtains a noun from the text data as a result of analysis processing, the CPU 101 sets, in a noun ID, an ID held in the storage device 106 in association with the noun. Note that if no noun is obtained from the text data, NULL (an example of an idle value) is set in the noun ID.

If the CPU 101 obtains a verb from the text data as a result of the analysis processing, the CPU 101 sets, in a command ID, an ID held in the storage device 106 in association with the verb. Note that if no verb is obtained from the text data, NULL (an example of an idle value) is set in the command ID.

The process then advances to step S202 in FIG. 2.

<Step S202>

The CPU 101 searches for a command file held in the storage device 106 in association with a set {scene ID (=NULL), noun ID, command ID} consisting of the noun ID and the command ID obtained in step S201 and a scene ID (=NULL (an example of an idle value)). Since this command file does not depend on the scene ID, the command file is independent of a scene.

As a result of the search, if the CPU 101 finds the command file from the storage device 106, the process advances to step S203; otherwise, the process advances to step S204.

<Step S203>

The CPU 101 reads out the command file found in the search in step S202 from the storage device 106 to the RAM 102.

<Step S204>

A GUI (Graphical User Interface) corresponding to the execution of the application software is displayed on the display screen of the display device 105. The CPU 101 performs scene analysis processing of analyzing which scene is displayed on the display screen of the display device 105 (that is, which screen of which application software is displayed on the display screen of the display device 105). Details of the scene analysis processing in step S204 will be described with reference to the flowchart in FIG. 4.

Figure 4:
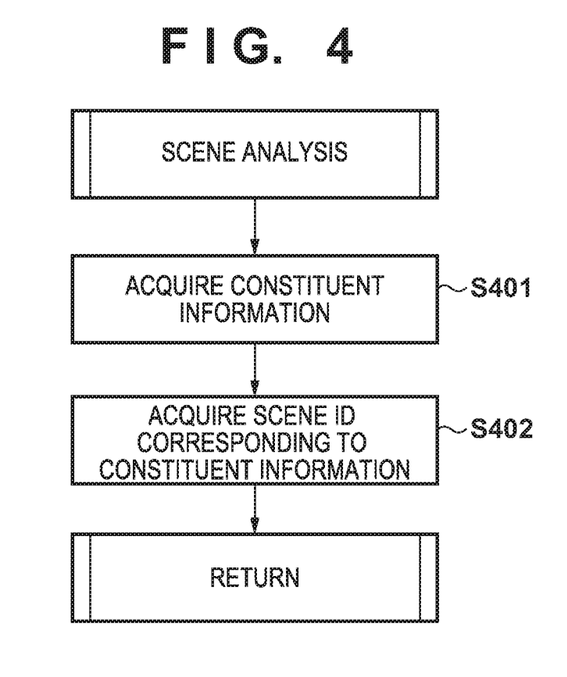
FIG. 4 is a flowchart showing the details of scene analysis processing in step S204.

<Step S401>

The CPU 101 acquires, as scene information representing a screen displayed on the display screen of the display device 105, "screen constituent information displayed on the display screen" such as kinds of objects (the objects need not be all objects, but can be some of the objects) displayed on the display screen and the layout of the objects. The screen source codes displayed on the display screen of the display device 105 are included in the application software. From the source codes, the CPU 101 can acquire the kinds of objects displayed on the display screen of the display device 105 and the layout of the objects. Note that a method of acquiring the constituent information is not limited to this. For example, if a screen displayed on the display screen of the display device 105 is a web page downloaded from an external apparatus such as the server apparatus 200, the source codes of this web page may be acquired from the server apparatus 200, thereby acquiring the constituent information from the source codes. Alternatively, for example, images of various kinds of screens of the various kinds of application software may be collected in advance and held in the storage device 106, and an image most similar to the screen displayed on the display screen of the display device 105 may be acquired from the images as the constituent information. In this manner, the method of acquiring the constituent information of the screen is not particularly limited.

<Step S402>

The CPU 101 sets, in the scene ID, an ID held in the storage device 106 in association with the constituent information acquired in step S401. IDs corresponding to various kinds of pieces of constituent information are held in the storage device 106. In step S402, out of the IDs held in the storage device 106, the ID held in the storage device 106 in association with the constituent information acquired in step S401 is set in the scene ID.

The process then advances to step S205 in FIG. 2.

<Step S205>

In step S205, the CPU 101 reads out, to the RAM 102, the command file held in the storage device 106 in association with the set {scene ID, noun ID, command ID} including the noun ID and the command ID acquired in step S201 and the scene ID acquired in step S402. Since this command file depends on the scene ID, the command file depends on the scene.

<Step S206>

The CPU 101 executes processing in accordance with the command file read out to the RAM 102 in step S203 or step S205. The command file is a file which defines the sequence of processes such as process A→process B→process C→ . . . . Therefore, in this step, the CPU 101 executes the processing sequence defined in the command file read out to the RAM 102 in step S203 or step S205.

<Step S207>

The CPU 101 determines whether a processing end condition is satisfied. For example, if the user inputs a processing end command using the user interface 104, the CPU 101 determines that the processing end condition is satisfied.

If the processing end condition is satisfied, the processing according to the flowchart in FIG. 2 ends. On the other hand, if the processing end condition is not satisfied, the process returns to step S201 to accept the next voice input.

Processing according to the flowchart in FIG. 2 will be described with reference to the detailed example.

Assume that the user who observes the GUI displayed on the display screen of the display device 105 upon execution of the application software utters a message "Display today's schedule". At this time, in step S301, text data describing "Display today's schedule" is acquired. In strep S302, "today" and "schedule" as nouns and "display" as a verb are specified from this text data. In step S302, a noun ID "today: time" of the noun "today", a noun ID "schedule: others" as the noun "schedule", and a command ID "display system" of the verb "display" are further acquired. At this time, since no scene ID is specified, NULL as the default value is set in the scene ID. By the search in step S202, if a command file corresponding to a set {NULL, {today: time", "schedule: others", "display system"} is found, this command file is acquired in the RAM 102 in step S203. This command file defines the processing sequence "start the calendar→click the schedule at the designated date/time". The process advances from step S203 to step S206. In step S206, the processing sequence defined by the command file acquired in step S203 is executed. That is, the calendar application software is started, and then "schedule for the designated date" displayed on the screen (calendar screen) of the application software is clicked. As the designated date, today's date (for example November 9) which is set by the CPU 101 for the "time" of the noun ID "today: time" is used, and a region corresponding to November 9 in the calendar screen is clicked. Note that the CPU 101 has a timepiece function such as a timer, and today's date (for example November 9) counted by the CPU 101 is set in the "time" of the noun ID "today: time".

Assume that the user who observes the GUI displayed on the display screen of the display device 105 upon execution of the application software utters a message "the way to go there". At this time, in step S301, text data describing "the way to go there" is acquired. In step S302, "there" as the noun and "go" as the verb are specified from the text data. In step S302, a noun ID "there: location" and a command ID "go system" of the verb "go" are further acquired. At this time, since no scene ID is specified, NULL as the default value is set in the scene ID. Assume that by the search in step S202, no command file corresponding to a set {NULL, "there: location", "go system"} is found. In step S401, constituent information is acquired. In step S402, "display the schedule in the calendar" is acquired as the scene ID corresponding to this constituent information. In step S205, a command file corresponding to the set {"display the schedule in the calendar", "there: location", "go system" is acquired. This command file defines the processing sequence "the user clicks the scheduled location to display the map→click the route→input the departure→search for route". The process advances from step S205 to step S206. In step S206, the processing sequence which defines the command file acquired in step S205 is executed. At this time, since the destination image as the schedule displayed in the calendar is displayed on the display screen of the display device 105, this image to start the map application software is clicked. The peripheral map including the destination is displayed on the display screen of the display device 105. The "route" in the screen of the map application software to display the screen for inputting the departure and the destination is clicked. In the screen, the present location obtained by a unit such as a GPS to the departure on the screen is input. The location (a character string representing the location name corresponding to the clicked image) to be set by the CPU 101 for the "location" of the noun ID "there: location" to the destination is input. After that, a route search is then performed.

Second Embodiment

In the following embodiments including the second embodiment, differences from the first embodiment will be described. Matters in the following embodiments are similar to the first embodiment, unless otherwise specified.

If the processing sequence according to the command file "start the calendar"→click the schedule at the designated date/time" described as an example of the first embodiment is to be executed, the "designated date/time" is needed as a parameter. In the first embodiment, the user utters "today" as a word for setting this parameter "the designated date/time". However, if no word for setting the parameter "the designated date/time" is uttered, an inquiry may be made to the user for setting the parameter "the designated date/time" unless the word for setting the parameter "the designated date/time" is obtained before processing according to the command file is executed. For example, if the word for setting the parameter "the designated date/time" is not obtained, a message "Which date do you want to display?" created in advance as the corresponding message is displayed on the display screen of a display device 105 to prompt the user to input a voice. In addition to or in place of this, the message "Which date do you want to display?" created in advance as the corresponding message may be output from a loudspeaker (not shown) as a voice to prompt the user to input a voice.

This also applies to other cases. If no word for setting a parameter is obtained before processing according to a command file is executed, a message created in advance as the corresponding message may be displayed on the display screen of the display device 105 to prompt the user to input a voice. In addition to or in place of this, a message created in advance as the corresponding message may be output from a loudspeaker (not shown) as a voice to prompt the user to input a voice.

Third Embodiment

In the first embodiment, the various kinds of screens such as the application software screen are displayed on the display screen of a display device 105 of an information processing apparatus 100. However, the present invention is not limited to this. That is, display may be made on a display device directly or indirectly connected to the information processing apparatus 100.

Fourth Embodiment

In the first embodiment, a scene is analyzed or a command file is specified using, as a trigger, a user's voice command input. However, the trigger for analyzing the scene or specifying the command file is not limited to this.

Figure 5:
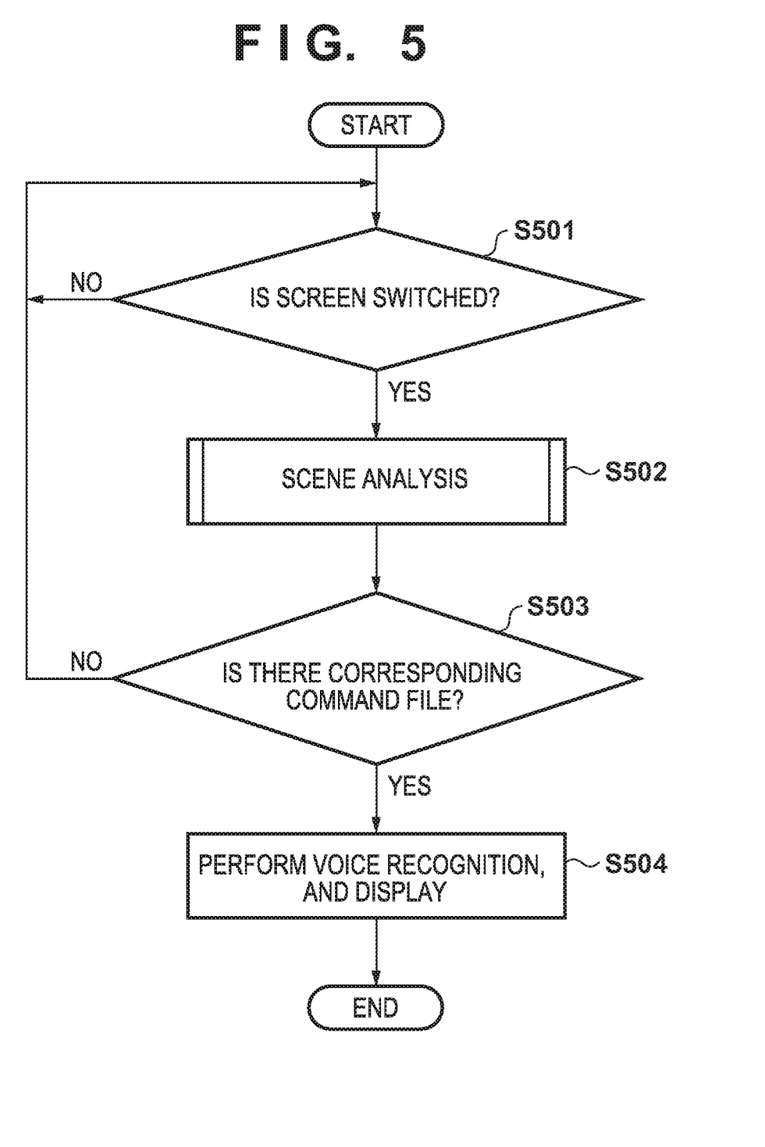
FIG. 5 is a flowchart according to the fourth embodiment.

An example of a trigger for analyzing a scene or specifying a command file will be described below. In the following description, an arrangement for causing a user to input a screen title on another screen by a voice upon switching the display screen of a display device 105 to the other screen upon satisfying a condition will be described below. The flowchart of this processing is shown in FIG. 5. The processing according to the flowchart in FIG. 5 can be performed simultaneously with the processing according to the flowchart in FIG. 2 or may be completed until step S207.

In step S501, the CPU 101 determines whether the screen displayed on the display screen of the display device 105 is switched. If the user inputs a screen switching command by operating a user interface 104 or the user inputs a screen switching command by a voice, a CPU 101 switches the screen in accordance with the switching command. If a difference between the schedule date registered in the calendar application software and the current date is equal to or less than a predetermined value or if the present location acquired by a unit such as a GPS falls within a predetermined distance from the destination registered in the calendar application software, the CPU 101 may switch the screen. That is, a condition for switching the screen is not limited to a specific condition.

As a result of the above determination, if the screen is switched, the process advances to step S502; otherwise, the process returns to step S501.

In step S502, the CPU 101 performs scene analysis similar to that in step S204 on the switched screen, thereby specifying a scene ID corresponding to the screen.

In step S503, the CPU 101 performs determination processing similar to that in step S202. In this step, the CPU 101 searches for a command file corresponding to the set {scene ID, NULL, NULL}. By this search, if the command file corresponding to the set {scene ID, NULL, NULL} is found, the process advances to step S504; otherwise, the process returns to step S501.

In step S504, the CPU 101 performs processing according to the command file found in step S503. For example, if the command file is "Input the title of the switched screen by a voice", the CPU 101 displays a message "Input the title" or the like on the display screen of the display device 105. If the user utters a voice, text data as a result of voice recognition result is displayed as the title on the display screen of the display device 105. In addition to or in place of this, if the command file is "Input the title of the switched screen by a voice", a message such as "Input the title" may be output as a voice message from a loudspeaker (not shown).

Note that a message "The oo is scheduled after X hours" may be displayed on the display screen of the display device 105 X hours before the scheduled time added to the calendar application software. Alternatively, a message "it will take X minutes to reach the destination" may be displayed on the display screen of the display device 105 if the present location comes close to the scheduled location added to the calendar application software. Note that in addition to or in place of this, the message may be output from a loudspeaker (not shown) as a voice.

Fifth Embodiment

Various kinds of pieces of information such as noun IDs, command IDs, parameters, constituent information, and command files which are held in a storage device 106 may be appropriately edited, added, or deleted by a user, a system administrator, or staff of a company as the publisher (manufacturer) of software for allowing an information processing apparatus 100 to execute processing according to the flowchart in FIG. 2. Such information editing/addition/deletion can be performed, for example, when new application software is added, existing application software is edited/deleted, or an OS is upgraded.

Sixth Embodiment

The application software and data explained as being held in the storage device 106 in the first embodiment may be held in an external apparatus (for example, a server apparatus 200) directly or indirectly connected to an information processing apparatus 100. In this case, the information processing apparatus 100 accesses the external apparatus and downloads necessary information from the external apparatus, as needed. Note that any specific form is not given to the role of the information processing apparatus 100 to process specific information with respect to the external apparatus. For example, information frequently used in the information processing apparatus 100 may be held in the information processing apparatus 100.

Seventh Embodiment

A form of acquiring a voice recognition result is not limited to a specific one. For example, the application software installed in an information processing apparatus 100 may acquire a voice recognition result using a voice recognition service provided by a server apparatus 200.

In addition, the text data obtained by voice recognition may be used directly as a processing target from step S302 or may be used as a processing target from step S302 after appropriate editing. For example, the acquired text data may be displayed on a display device 105, and the use who observes the text data may edit the text data using a user interface 104.

In addition, in the first embodiment, analysis processing such as parsing for the text data is performed to specify a noun and a verb included in the text data, and a command file is searched for based on the specified noun and verb. However, the corresponding command file may be searched for without performing analysis processing such as parsing for the text data. Assume that a command file (defining a processing sequence "obtain a screen shot") for text data in which a character string "screen shot" is described is held in a storage device 106. If the text data describing the character string "screen shot" is obtained, the corresponding command file (defining a processing sequence "obtain a screen shot") is searched for from the storage device 106. In addition, an adverb (for example, "little more" or "more") may be specified in addition to the noun and verb from the text data. In this case, a command file corresponding to a set of a scene ID, a noun ID, a command ID, an adverb ID (that is, the ID of the specified adverb) is specified.

In addition, text data obtained as a result of voice recognition may be interpreted ambiguously. For example, if text data describing a character string "wa-fu-i-o-n" is obtained as a result of voice recognition, this character string may be converted into a character string "Wi-Fi ON" by a function such as known ambiguous interpretation.

A processing sequence defined by a command file may include processing using an OS as a target, such as OS setting.

In the fourth embodiment, the screen is switched if a difference between the schedule date registered in the calendar application software and the current date is equal to or less than a predetermined value or if the present location acquired by a unit such as a GPS falls within a predetermined distance from the destination registered in the calendar application software. However, screen switching is not indispensable. Assume that a difference between the schedule date registered in the calendar application software and the current date is equal to or less than a predetermined value or that the present location acquired by a unit such as a GPS falls within a predetermined distance from the destination registered in the calendar application software. In this case, if a condition is satisfied, the process may advance to step S502.

If a voice is further input within a predetermined time (the predetermined times may be equal or different depending on the command files) after a processing sequence defined in a command file is executed, the voice may be highly associated with the immediately preceding voice processing. For example, if the user utters "little more" within a predetermined time after the user utters "zoom-in" during the execution of camera application software, the camera performs a zoom-in operation in accordance with the utterance contents "zoom-in" and further performs the zoom-in operation in accordance with the utterance contents "little more". In this case, the command file corresponding to "little more" is a command file corresponding to a set including the noun ID and the verb ID corresponding to the immediately preceding operation (zoom-in) and the scene ID corresponding to the screen of the camera application software. If an opposite command such as "revert" is uttered in place of "little more" after "zoom-in" is uttered, the camera performs the zoom-in operation in accordance with the utterance contents "zoom-in" and performs an opposite operation (an operation opposite to the immediately preceding operation (zoom-in)) of returning the scale to the immediately preceding scale in accordance with the utterance contents "revert". In a principle similar to this, for example, if the user utters "Set Wi-Fi on" and then utters "No, stop", the Wi-Fi may be set on and then set off (an opposite operation to the immediately preceding operation (Set Wi-Fi on)).

Note that a command file corresponding to a voice input following the immediately preceding processing need not be associated with a scene ID. That is, since a voice input following the immediately preceding processing is highly associated with the immediately preceding processing, a command file corresponding to the voice input following the immediately preceding processing may be simply a command file corresponding to a noun ID and a verb ID.

In the first embodiment, a command input is made by a voice, but the command input may be performed using a means other than the voice message. For example, the command input methods include a key input, a gesture input (a user's gesture is captured by an image capturing device, and the information processing apparatus 100 recognizes the gesture captured in a moving image/still image obtained by image capturing), an input based on a sensing result using each of various kinds of sensors, and the like. For example, if a hand-waving gesture is input, a message "good-bye" corresponding to the recognition result of this gesture may be displayed.

Eighth Embodiment

The numerical values and the kinds of application software programs used in the above description are used to explain detailed examples. The above embodiments are not limited to these detailed examples. In addition, some or all of the embodiments described above may be appropriately combined and used. In addition, some or all of the embodiments described above may be selectively used.

The invention is not limited to the foregoing embodiments, and various variations/changes are possible within the spirit of the invention.

What is claimed is:

1. An information processing apparatus comprising:
   at least one memory storing instructions; and
   at least one processor that, upon executing the stored instructions, performs the functions of
   a first acquiring unit configured to acquire text data representing contents of an input command;
   a second acquiring unit configured to acquire scene information representing contents of a displayed screen;
   a third acquiring unit configured to acquire a command file which corresponds to a combination of an analysis result of the text data and the scene information; and
   an execution unit configured to execute processing in accordance with the command file,
   wherein in a case where the third acquiring unit acquires one of the analysis result of the text data and the scene information and does not acquire the other of the analysis result of the text data and the scene information, the third acquiring unit acquires a command file which corresponds to a combination of an idle value and the one of the analysis result of the text data and the scene information.

2. The apparatus according to claim 1, wherein the second acquiring unit acquires, as the scene information, a type of an object displayed on the screen and a layout of the object.

3. The apparatus according to claim 1, wherein the second acquiring unit acquires, as the scene information, an image most similar to the displayed screen or a part of the displayed screen, out of a plurality of images held in advance.

4. The apparatus according to claim 1, wherein the command file comprises (i) a file which defines that one or more operations for a screen which is displayed are performed, (ii) a file which defines that one or more operations which do not depend on a screen are performed, or (iii) a filed which defines that one or more operations for a screen which is displayed and one or more operations which do not depend on a screen are performed.

5. The apparatus according to claim 1, wherein the first acquiring unit acquires, as the text data, a result of voice recognition for an input voice.

6. The apparatus according to claim 5, wherein the execution unit sets a processing parameter included in the command file based on the result of the voice recognition.

7. The apparatus according to claim 6, wherein the execution unit performs display for prompting a user to input a voice corresponding to the process parameter if the processing parameter included in the command file cannot be set based on the result of voice recognition.

8. The apparatus according to claim 6, wherein the execution unit prompts the user to input a voice corresponding to the process parameter using an audible prompt if the processing parameter included in the command file cannot be set based on the result of the voice recognition.

9. The apparatus according to claim 5, wherein the first acquiring unit displays the result of the voice recognition.

10. The apparatus according to claim 1, wherein the first acquiring unit acquires, as the text data, an input result by one of a key input, a gesture input, or an input based on a sensing result by a sensor.

11. An information processing method comprising:
    acquiring text data representing contents of an input command;
    acquiring scene information representing contents of a displayed screen;
    acquiring a command file which corresponds to a combination of an analysis result of the text data and the scene information; and
    executing processing in accordance with the command file,
    wherein in a case where the acquiring a command file acquires one of the analysis result of the text data and the scene information and does not acquire the other of the analysis result of the text data and the scene information, the acquiring a command file comprises acquiring a command file which corresponds to a combination of an idle value and the one of the analysis result of the text data and the scene information.

12. A non-transitory computer-readable storage medium storing a computer program for causing a computer to function as:
    a first acquiring unit configured to acquire text data representing contents of an input command;
    a second acquiring unit configured to acquire scene information representing contents of a displayed screen;
    a third acquiring unit configured to acquire a command file which corresponds to a combination of an analysis result of the text data and the scene information; and
    an execution unit configured to execute processing in accordance with the command file,
    wherein in a case where the third acquiring unit acquires one of the analysis result of the text data and the scene information and does not acquire the other of the analysis result of the text data and the scene information, the third acquiring unit acquires a command file which corresponds to a combination of an idle value and the one of the analysis result of the text data and the scene information.

* * * * *